United States Patent
VonDross (10) Patent No.: US 9,016,019 B2
(45) Date of Patent: Apr. 28, 2015

(54) COMPOSITE MASONRY BLOCK AND METHOD OF MAKING THE SAME

(71) Applicant: Kerry VonDross, Waukesha, WI (US)

(72) Inventor: Kerry VonDross, Waukesha, WI (US)

(*) Notice: Subject to any disclaimer, the term of this patent is extended or adjusted under 35 U.S.C. 154(b) by 0 days.

(21) Appl. No.: 13/850,659

(22) Filed: Mar. 26, 2013

(65) Prior Publication Data
US 2013/0255177 A1 Oct. 3, 2013

Related U.S. Application Data

(60) Provisional application No. 61/617,156, filed on Mar. 29, 2012.

(51) Int. Cl.
E04C 2/04 (2006.01)
E04C 1/40 (2006.01)

(52) U.S. Cl.
CPC .......................................... E04C 1/40 (2013.01)

(58) Field of Classification Search
USPC ........ 52/405.4, 424, 426, 425, 564, 379, 598, 52/563, 428, 562, 565, 568, 582.1, 503, 52/606, 439, 286, 504, 576, 596, 597; 264/274
See application file for complete search history.

(56) References Cited

U.S. PATENT DOCUMENTS

| | | | |
|---|---|---|---|
| 994,027 A | 5/1911 | O'Beirne | |
| 1,011,753 A * | 12/1911 | Crocker | 52/565 |
| 1,038,257 A | 9/1912 | Yourelle et al. | |
| 1,226,214 A | 5/1917 | Hopkins | |
| 1,345,156 A | 6/1920 | Flynn | |
| 1,384,003 A | 7/1921 | Thompson | |
| 1,604,796 A | 10/1926 | Wiederholdt | |
| 1,700,512 A * | 1/1929 | Pedersen | 264/253 |
| 2,134,894 A | 11/1938 | Schubert | |
| 2,172,052 A | 9/1939 | Robbins | |
| 2,181,698 A | 11/1939 | Langenberg | |
| 2,326,361 A | 8/1943 | Jacobsen | |
| 2,647,392 A | 8/1953 | Wilson | |
| 3,855,752 A * | 12/1974 | Aylon | 52/605 |
| 4,180,956 A | 1/1980 | Gross | |
| 4,229,920 A * | 10/1980 | Lount | 52/309.12 |
| 4,263,765 A | 4/1981 | Maloney | |
| 4,348,847 A | 9/1982 | Jukes | |
| 4,703,602 A | 11/1987 | Pardo | |
| 4,745,720 A | 5/1988 | Taylor | |
| 4,833,852 A | 5/1989 | West | |
| 4,841,707 A | 6/1989 | Novoa | |
| 4,862,660 A | 9/1989 | Raymond | |
| 5,459,970 A | 10/1995 | Kim | |

(Continued)

Primary Examiner — Robert Canfield
Assistant Examiner — Babajide Demuren
(74) Attorney, Agent, or Firm — Andrus Intellectual Property Law, LLP (57) ABSTRACT

A multi-component composite block includes a pair of opposed and parallel masonry face panels amalgamated with transverse non-masonry truss-webs or a truss-module including a plurality of joined non-masonry truss-webs. Truss-webs and/or truss-module are delivered within the mold assembly and aligned, retained, and held fast in place by mold apparatuses. Portions of truss-web and/or truss-module unite together with mold apparatuses to shape partitioned residual cavity spaces for the addition of concrete block forming material to form face panels. The truss-web members and/or truss-module have configured elements that integrate with the concrete mass of the face shells providing a permanent amalgamated bond. The assembled multi-component composite block is rigidly stable, durable, structural, lightweight, and thermally efficient.

18 Claims, 5 Drawing Sheets

(56) References Cited

U.S. PATENT DOCUMENTS

| | | | |
|---|---|---|---|
| 5,570,552 A | 11/1996 | Nehring | |
| 5,704,180 A * | 1/1998 | Boeck | 52/426 |
| 5,809,728 A | 9/1998 | Tremelling | |
| 5,845,448 A * | 12/1998 | Potvin | 52/563 |
| 6,435,471 B1 | 8/2002 | Piccone | |
| 6,694,692 B2 | 2/2004 | Piccone | |
| 6,978,581 B1 * | 12/2005 | Spakousky | 52/405.4 |
| 2001/0029717 A1 * | 10/2001 | Spakousky | 52/405.4 |

* cited by examiner

COMPOSITE MASONRY BLOCK AND METHOD OF MAKING THE SAME

CROSS-REFERENCE TO RELATED APPLICATION

The present application is based on and claims priority to U.S. Provisional Patent Application Ser. No. 61/617,156 filed Mar. 29, 2012.

BACKGROUND

The present disclosure generally relates to a multi-component masonry block. More specifically, the present disclosure relates to a masonry block that includes a pair of opposite facing panels that are joined with transverse non-masonry truss-web members or a truss module to form a composite block having enhanced energy saving properties.

The United States Department of Energy has developed a national energy policy for the purpose of conserving energy, including buildings and housing, in order to preserve our natural energy resources and become less reliant on foreign nations for energy sources. A majority of states have passed laws mandating that new building structures must comply with increased energy efficiency standards. Highly insulated thermal envelope systems are required in order to reduce the energy used to heat and cool the building's interior conditioned space. Many existing wall systems will not meet the new energy efficiency standards now mandated, and others will not meet newer energy efficiency standards planned for the future.

Concrete block are extensively manufactured for use as a building material and are often used to construct single wythe masonry exterior walls for numerous building types and related structures. Conventional masonry blocks manufactured on modern block making machines have two parallel concrete face shells cast simultaneously with interconnecting, lateral, concrete cross-webs. These block units are individually laid to build single wythe masonry walls.

However, a major drawback in typical single wythe concrete block construction is its inability to provide a well-insulated thermal envelope wall, because concrete blocks including concrete cross-webs exhibit high thermal conductivity and rapid heat loss through its composition. The insulation value of a typical single wythe concrete block wall may be marginally improved by filling the cores formed between the face shells and cross-webs with insulation. However, because the high thermally conductive concrete cross-webs penetrate the insulation, the cross-webs facilitate rapid heat loss through the wall by a process commonly referred to as thermal bridging. Thus, walls constructed with conventional single wythe concrete block can only provide a meager building thermal envelope, because they contain numerous concrete cross-webs in their framework.

Adaptations to the typical block structure utilizing conventional manufacturing techniques have been developed, including: reducing the number of concrete cross-webs and/or reducing the cross sectional area of these webs. While these means reduce the overall thermal bridging effect of the cross-webs, they yet render an insufficient product for use in constructing high performance thermal envelopes that demand greater R-values to better conserve on the energy required to heat and cool a building's interior conditioned space. Other concrete block designs have been devised that completely separate the interior and exterior concrete face-shell segments with continuous interconnecting and/or adhered rigid insulation, thus eliminating the thermal bridging effect. These concrete blocks are formed with a middle rigid insulation material and outer concrete portions. The outer face-shells are cast on conventional block making machines and later factory assembled together with the mid-portion insulation component.

These improvements provide an increase in thermal performance; however these block units have limitations associated with manufacturing, handling, and field installation. Further, methods for separating the block face shells by completely eliminating the concrete cross-webs and substituting them with plastic strut members are known. The concrete face shell segments are independently cast on conventional block making machines and later hand-assembled together with the synthetic cross members being joined utilizing various male-female connection schemes with the connections employing a resilient friction fit or adhesive bond to maintain engagement of the assorted components. These adaptations provide means to improving the thermal efficiency of concrete masonry units; however they lack connection strength, do not adequately provide vertical or lateral stability relative to face shell alignment, and require expensive, cumbersome, and time consuming assembly of the multiple component pieces.

SUMMARY

The present disclosure is designed to address the above noted problems by introducing novel components, structure, and means of manufacturing a composite masonry unit quickly and efficiently without the need for post assembly of component parts. The disclosure also eliminates the need for manufacturing conventional block units having concrete cross-webs that cause thermal bridging. The disclosure makes use of any variety of synthetic non-masonry truss-webs and/or a truss-module comprising joined truss-web members and amalgamates these components with masonry facing panels to provide a composite block having increased unit structural stability and reduced thermal bridging. The device of the present disclosure utilizes an assortment of synthetic truss-webs and/or truss modules that are capable of being inserted into, and securely restrained within, a mold forming assembly. The disclosure provides a means for cement mixture during the molding process of concrete face shells to amalgamate with synthetic truss-webs and/or truss-module, which results in these components being permanently integrated and linked. The disclosure provides components and method for producing an intact composite block comprising united concrete face shells with synthetic non-masonry truss-webs and/or truss-module, which provides a masonry block unit having superior resistance to vertical and lateral torque forces experienced during stripping, cubing, shipping, and handling, and provides structural integrity and strength between the interior and exterior face shell planes when the units are collectively assembled in a finished wall and subject to lateral, compressive, axial, and flexural loads.

The present disclosure relates to composite masonry block units capable of being manufactured on conventional block making machines or other concrete forming machinery. A vertically oriented mold box assembly for forming concrete blocks is configured having internal walls of any arrangement of full or partially tapered or full or partially curved core bells, end core liners, and/or positioning spines, which configure interconnected conterminous cavity spaces. Portions of the cavity spaces are designed to receive truss-web members and/or a truss-module comprising joined truss-web members therein that combine with the internal walls of the mold box assembly and portions of the core bells and end liners to form distinct residual cavity spaces that are filled with cement block forming material therein.

The truss-web members and/or truss-module are placed on top of a portable support plate, which is commonly referred to as a pallet. The pallet with truss-webs and/or truss-module thereon is delivered on conveyors and is positioned underneath the mold assembly. Alternatively, truss-web members and/or truss-module are placed on the pallet when the pallet is in a stationary position underneath the mold assembly. The pallet is lifted to abut the underside surface of the mold box assembly. During the lifting process, the truss-webs and/or truss-module are simultaneously inserted, aligned, and fitted into cavity portions of the mold assembly. The truss-webs members and/or truss-module comprise tapered or curved extended flanges that correspondingly mate to the profile of tapered or curved walls or partial tapered or curved segments thereof of core bells, end core liners, and/or positioning spines. The truss-web members and/or truss-module are held in vertical alignment by the lower supporting pallet and a top plate that can have a compression gasket, and are held and buttressed in a set horizontal position by the abutting core bells, end core liners, and/or positioning spines.

When positioned within the mold assembly, portions of the truss-webs and/or truss-module combine with portions of the core bells and/or end core liners and walls of the mold assembly to create discrete residual cavities designated to receive cement material for the formation of concrete face shells that can have appendages. The abutting and mating contact of portions of the truss-webs and/or truss-module with portions of the core bells and/or end core liners creates a seal to prevent passage of cement mixture from flowing into other cavity spaces or voids within the mold assembly. Portions of the truss-webs and/or truss-module abut to and extend within the residual cavities designated to receive cement material and/or have hollows or voids thereof to be filled with the cement mixture. The truss-web members and/or truss-module are configured such that when plastic cement material is added to cavities designated to receive the cement material, it dispenses in, through, below, to the sides, above, and/or around portions of the truss members and/or truss-module integrating and connecting the two diverse material elements.

Consequently, block forming cement material is placed from above the mold assembly into the residual mold cavity spaces forming a pair of opposed and parallel rectangular masonry panels that can comprise appendages. The cement material is vibrated and compacted, which further facilitates the flow of the cement mixture to dispense around protrusions and/or penetrate into voids and/or indentations of the truss-webs members and/or truss-module forming a dense structural amalgamation of the diverse materials. Subsequently, the pallet is lowered from the block mold assembly, which simultaneously removes the synthetic non-masonry truss-webs members and/or truss-module and concrete masonry face shells united as a cohesive unit thereon. The composite masonry block unit is then cured until such time as the cement block forming material sets to a hardened concrete mass.

Accordingly, the present disclosure can provide a system of components, structure, and a method for producing a sturdy composite masonry block.

The present disclosure provides a composite block that is cost-effective and is easily and economically mass produced on conventional block making machines or other concrete forming machines and eliminates the need for post-assembling of various pre-manufactured components. The concrete block is modular, lightweight, easy to grasp, lift, handle, and place, and is resistant to sound transmission, rot, decay, insects, mold, and moisture movement. The composite block exhibits particularly high thermal resistance properties with negligible thermal bridging heat transfer between the exterior and interior concrete face shell panels. The composite block may be used in single wythe masonry wall construction and provide attractive and durable exterior and interior finishes, structural load-bearing capabilities, and improved thermal envelop performance.

The present disclosure can provide a pair of exterior exposed substantially rectangular formed concrete face shell panels amalgamated and integrally bound with synthetic non-masonry truss-web members and/or truss-module that serve to space apart and hold together in alignment the concrete panels.

The present disclosure can provide synthetic non-masonry truss-web members and/or truss-module that extend across the space between two independent concrete face shell panels for securing the panels in opposing, parallel, and fixed space orientation and to accommodate and provide for compression and tensile restraint and shear transfer between the panels.

The present disclosure can provide a method of delivering, inserting, aligning, and fitting, truss-web members and/or truss-module into block making molds used for forming concrete block, securing and holding fast the truss members and/or truss-module during the cement casting, vibration, and compaction of the concrete facing panels, and simultaneous removal of the truss members and/or truss-module together with the concrete face panels as an amalgamated, interconnected, composite unit from the block making molds.

The present disclosure can provide truss-web members and/or truss-module having portions thereof acting in conjunction with other block mold apparatuses or portions thereof to form contiguous walls that create distinct cavities for receiving cement mixture.

The present disclosure can provide truss-web members and/or truss-module having portions thereof acting in conjunction with other mold apparatuses or portions thereof to create containment seals to prevent semi-plastic cement mixture from flowing outside cavity spaces designated to receive the cement mixture and into other mold cavity spaces during the placement of the cement mixture into block forming molds.

The present disclosure can provide truss-web members and/or truss-module having a portion thereof containing voids, holes, hollows, indents, cavities dimples openings, fissures, extensions, projections, flanges, lips, and/or nubs or other designs which accommodates the placement of a plastic cement mixture to flow and be distributed within, by, under, over, through, and/or around portions of the truss-web members and/or truss-module to form an integral homogenous bonding of the masonry panels to the truss-web members and/or truss-module.

The present disclosure can provide truss-web members and/or truss-module having surface portions thereof containing indentations, serrations, holes, hollows, protrusions, bulges, a thickened mass or texture to provide a better grip of the composite block unit.

A related device of the present disclosure is the truss-web members and/or truss-module can have surface portions thereof containing indentations, serrations, holes, hollows, protrusions, bulges, a thickened mass, or texture that provides the surface portion areas with uneven consistency to which concrete grout mixture can more readily bond to when masonry walls constructed with the present composite block are filled with the grout mixture to strengthen the walls. This improved bonding of the concrete grout to the truss-web members and/or truss-module, which are integrated to the face shell panels, provides increased flexural strength to the masonry walls.

The present disclosure can provide truss-web members and/or truss-module being solid, or portions thereof containing vertical and/or horizontal cavities and/or other configurations to allow for the passage of insulation material to flow and be distributed through and within portions of the truss-web members and/or truss-module.

The present disclosure can provide truss-web members and/or truss-module having portions thereof containing vertical cavities and/or horizontal voids with the horizontal void openings sized from 1/8" to 1" diameter to prevent the passage of plastic cement out to pass through portions of truss-web members and/or truss-module, but allow for the passage of insulation material to flow and be distributed through and within portions of the truss-web members and/or truss-module.

DETAILED DESCRIPTION

Before any embodiments of the disclosure are explained in detail, it is to be understood that the disclosure is not limited in its application to the details of components, structure, means of manufacture and other aspects set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including," "comprising," "consisting," "containing," "being," or "having" and variations thereof is meant to encompass the items listed thereafter and equivalents thereof as well as additional items. Unless specified or limited otherwise, the terms "integrated," "connected," "supported," "joined." "united," "incorporated," "fastened," and "coupled" and variations thereof are used broadly and encompass both direct and indirect mountings, connections, supports, and couplings.

Figure 1:
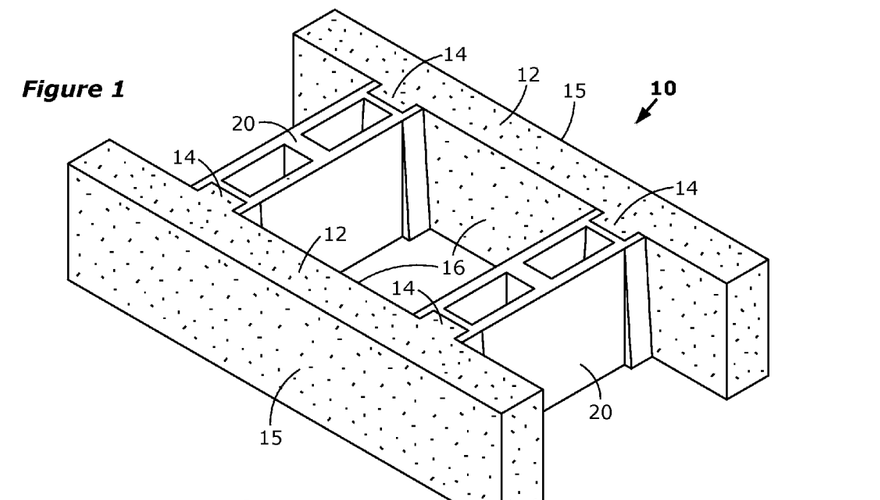
FIG. 1 is a perspective view of a composite masonry block constructed according to the disclosure.

With reference to FIG. 1, a composite block unit composed preferably of concrete masonry connected together with rigid non-masonry synthetic material such as plastic or rubber and made according to the present disclosure is generally designated by reference numeral 10. The composite block unit 10 includes two generally planer masonry facing panels 12 contiguous with and integrally joined to coupling truss-web members 20.

The rectangular masonry facing panels 12 are molded to the same height and length dimensions as each other and each have an outer surface 1 and an inner surface 16.

Extending perpendicular from inner surface 16 of masonry facing panels 12 are two formed thickset appendages 14, which are equal in height to the panels 12. The appendages 14 are fashioned in a spaced relation to each other along the longitudinal length of the panels 12 such that when multiple block units 10 are laid in a wall using a traditional masonry running bond pattern, the appendages 14 are in direct vertical alignment with those above and below each other.

Figure 2:
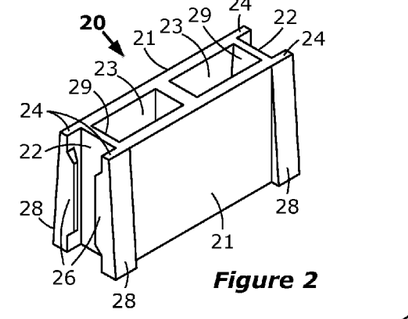
FIG. 2 is a perspective view of a truss-web member.

Shown in FIGS. 1 and 2 are coupling, truss-web members 20, which unite with and join masonry facing panels 12. Truss-web members 20 have vertical sides 21, vertical ends 22, and vertical cavities 23 formed therein that extend from the top to the bottom. It is understood that the configured cavities may be vertical and/or horizontal holes, may be more than one, and formed in various circumference profiles. Cavities 23 make truss members 20 significantly void in order to decrease their thermal conductivity, reduce material costs, and allow the truss members 20 to be filled with insulation material while yet maintaining portions of connecting perpendicular, longitudinal, and diagonal facets to provide lateral and vertical connective and rigid strength between the masonry members.

Truss-web members 20 comprise extended end flanges 24 and extended connector tongues 26. The connector tongues 26 vertically encompass only a partial height of the flanges 24.

Truss-web members 20 interface with thickset appendages 14 and masonry facing panels 12. Truss ends 22 and extended flanges 24 border the three exterior edges of the appendages 14 and the flanges 24 also abut the interior surface 16 of the panels 12. The junction between these components constrains both inward and longitudinal relative movement between the two panels 12 and provides torsional resistance to composite block unit 10.

Connector tongues 26 are opposite facing and internally penetrate into the mass of thickset appendages 14 creating a fastening of truss-webs 20 with masonry facing panels 12. The tongues 26 are shorter than the height of the appendages 14 allowing the concrete mass of the appendages 14 to be formed around, above, and below the tongues 26 thereby establishing a secure connection that constrains outward and vertical relative movement between the two panels 12 and further provides torsional stiffness to composite block unit 10.

Truss-web members 20 comprise tapered extended flanges 28 with thicker mass trending downward formed on vertical sides 21. Variations of the tapered flanges 28 can include having one, two (shown), three, or more tapered flanges of any variety of widths, or a continuously formed tapered flange along entire the vertical sides 21. The truss-webs 20 also comprise tapered segments 29 with thicker mass trending downward formed on the interior faces of wall segments that define cavities 23. Variations of the taper on the flanges 28 and the wall segments 29 can include an arc, curve, obtuse angle segments, and other such configurations that provide a contour with thicker mass trending downward. The tapered flanges 28 and the tapered wall segments 29 are purposed for aligning, positioning, bracing, and holding fast the truss-web members 20 during the production of composite block unit 10.

Figure 3:
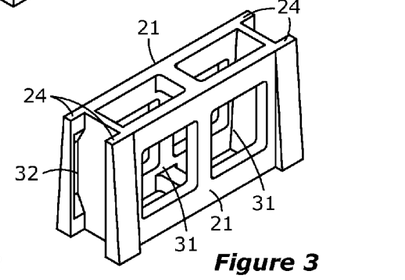
FIG. 3 is a perspective view of an alternate embodiment of a truss-web member.

FIG. 3 shows an alternate embodiment of a truss-web member according to the present disclosure, which incorporates and combines features of truss-web member 20. Truss-web members can have horizontal cavities 31 formed therein extending thorough vertical sides 21. Truss-web members can have a partial indented hollow 32 formed on extended flanges 24 extending vertically over only a partial height of the flanges 24. The indented hollow 32 can alternately be a cavity (not shown) formed continuously through the flanges 24.

Figure 4:
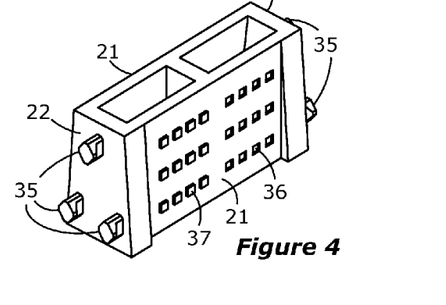
FIG. 4 is a perspective view of an alternate embodiment of a truss-web member.

FIG. 4 shows an alternate embodiment of a truss-web member according to the present disclosure, which incorporates and combines features of truss-web member 20. Truss-web members can be constructed without extended side flanges 24. Truss ends 22 may be formed having one, two, three (shown), or more contiguous anchors 35 which are configured having a massed segment thereof larger in size than a segment thereof in closer proximity to the truss ends 22. The truss-web members can be constructed with one, two, or more of various shaped indentations 36 and/or with one, two or more various shaped protrusions 37 on vertical sides 21, which are imposed for improved grip during handling of block unit assembly 10. Vertical sides 21 can also be imprinted with any of a variety of textures (not shown) to improve grip during handling.

Figure 5:
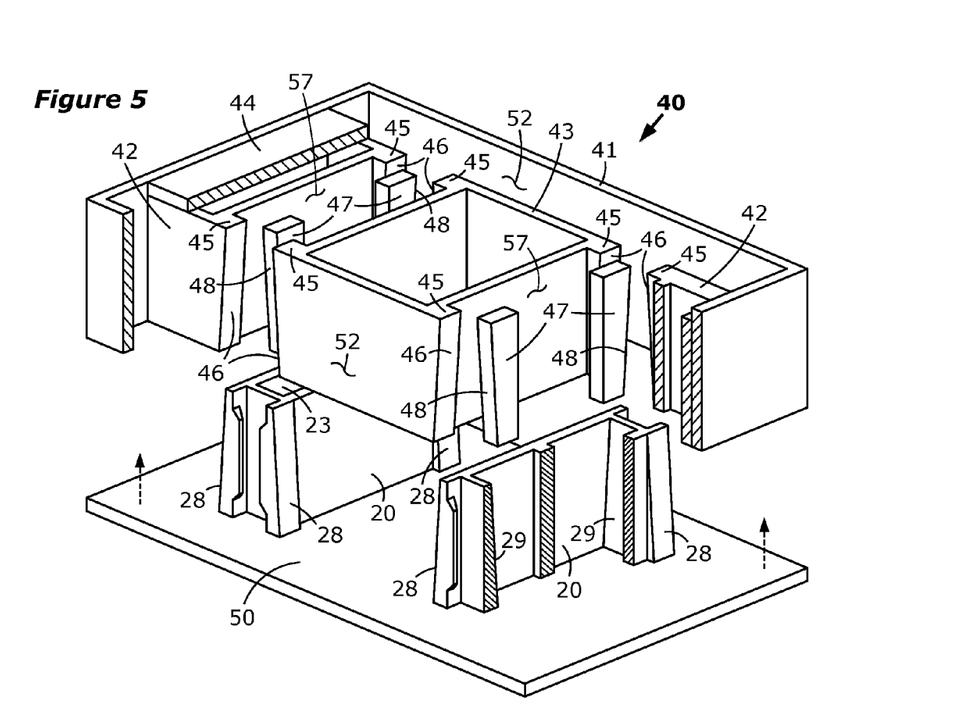
FIG. 5 is a fractional perspective view of a block forming mold assembly constructed according to the present disclosure and shows relative movement between a pallet, having truss-web members supported thereon, and the mold assembly.

FIG. 5 illustrates a block forming mold assembly generally designated by reference numeral 40. The mold assembly 40 includes a mold box 41 (partially shown), which configures a vertically oriented cavity that is open on its top and bottom. The mold assembly 40 also includes a series of end core liners 42 and center core bell 43 placed within the mold assembly. The end core liners 42 and center core bell 43 are purposed for forming cores and/or hollows in a block, which is known in the art of block making.

Figure 6:
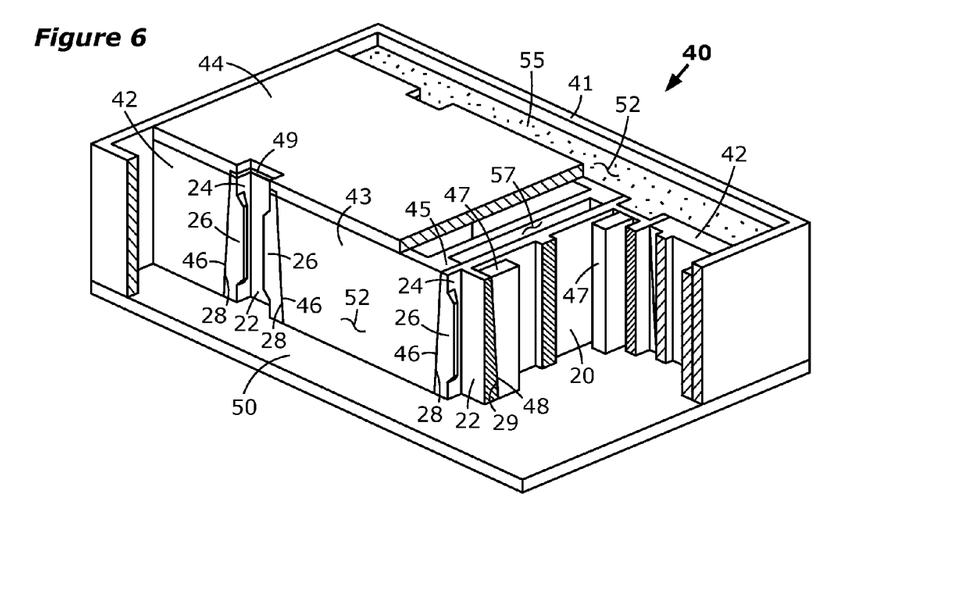
FIG. 6 is a fractional perspective view similar to FIG. 5 showing a pallet raised to abut a mold assembly, with truss-web members inserted into, aligned with, braced, and held fast by mold assembly apparatuses, with the truss-webs and the apparatuses establishing residual cavities for receiving block funning cement material.

As can best be seen in FIGS. 5 and 6, a lower plate commonly referred to as a pallet 50 is raised to seal the bottom of the mold assembly 40. The mold box 41, end core liners 42, center core bell 43, and raised pallet 50, cooperate to form a conterminous cavity comprising interconnected cavity spaces 52 and 57, which are closed at the bottom and opened on the top. In the art of conventional block making, the cavities 52 and 57 are simultaneously and collectively filled with cement mixture, which forms concrete face panels interconnected with concrete cross webs.

Figure 8:
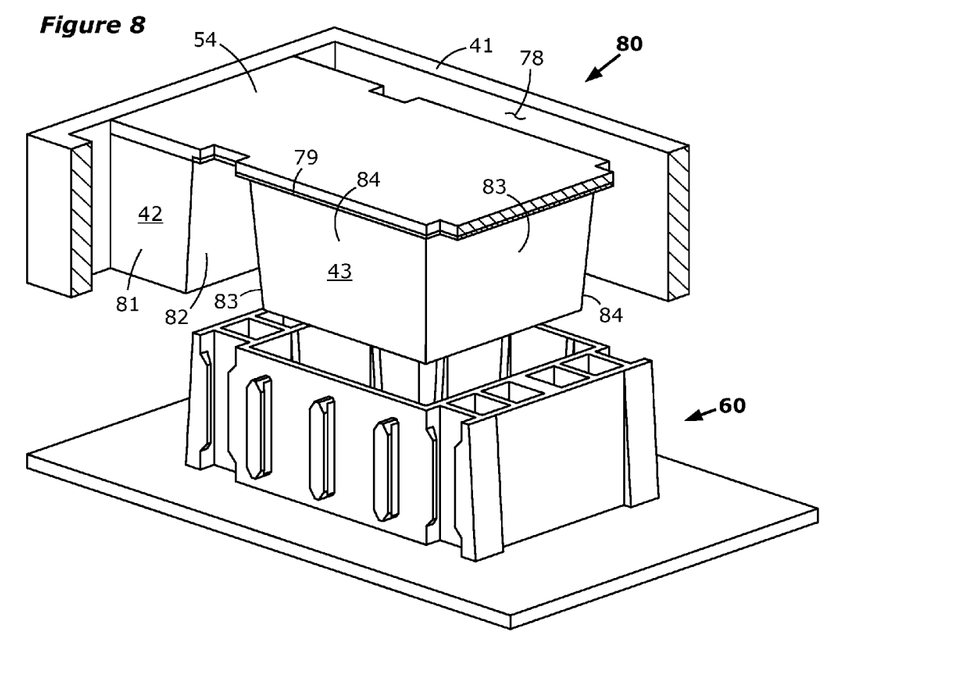
FIG. 8 is a fractional perspective view of an alternate block forming mold assembly constructed according to the present disclosure showing a pallet having a truss-module supported thereon beneath the mold assembly.

Referring to FIG. 5, according to the present disclosure, end core liners 42 and center core bell 43, are configured comprising extended flanges 45 having tapered ends 46 with thicker mass trending upward. Variations of the tapered end 46 on the flanges 45 can include an arc, curve, obtuse angle segments, and other such configurations that provide a contour with thicker mass trending upward. The upward slant of the tapered flange ends 46 are formed in opposing orientation to and in mating alignment with the downward slant of tapered surfaces 28 of truss-web members 20. The extended flanges 45 having tapered ends 46 located on a mutual side of end core liners 42 and center core bell 43 can be two (shown), three, or more. The end core liners 42 and center core bell 43 can also be formed with constant planer tapered sides 82 and 83 with thicker mass trending upward (as shown in FIG. 8).

According to the present disclosure, mold assembly 40 can be configured comprising vertically oriented spine members 47 having tapered ends 46 with thicker mass trending upward. Variations of the tapered ends 48 can include an arc, curve, obtuse angle segments, and other such configurations that provide a contour with thicker mass trending upward. The upward slant of the tapered ends 48 are formed in opposing orientation to and in mating alignment with the downward slant of tapered segments 29 of truss-web members 20. The spine members 47 are configured smaller in width and breadth than cavity spaces 23 of the truss-webs 20 and are equal or less than the height of the truss-webs 20.

As best shown in FIGS. 5 and 6, the mold assembly 40 can further be configured including a continuous horizontal top plate 44 (partially shown). The top plate 44 covers end core liners 42, center core bell 43, and cavity spaces 57 formed between the end core liners and the center core bell in order to prevent cement mixture from entering into and filling the end core liners 42, center core 43, and cavity spaces 57.

Top plate 44 can have compression gaskets 49 comprised of rubber or other material affixed to the bottom of the top plate 44 at the truss-web members 20 juncture locations, which serves to lessen impact and prevent the truss-webs 20 from crushing or cracking when inserted into the mold assembly 40 due to the rapid, upward, robust force applied when pallet 50 is mechanically lifted.

According to the method of the present disclosure, and seen in FIGS. 5 and 6, truss-web members 20 are placed on pallet 50 prior to the pallet being delivered beneath the mold assembly 40, or the truss-webs 20 are placed on the pallet 50 when the pallet 50 is in a stationary fixed position immediately underneath the mold assembly 40 and the pallet 50 is set to be lifted. Once positioned immediately below the mold assembly 40, the pallet 50 is raised, which lifts the truss-web members 20 thereon. During the upward conveyance, the truss-web members 20 become aligned into specific position by their tapered surfaces 28 engaging contact with the tapered ends 46 of flanges 45 and their tapered segments 29 engaging contact with tapered surfaces 48 of spine members 47.

Referring to FIG. 6, when block forming assembly is in position as shown with pallet 50 raised and abutting mold assembly 40, truss web members 20 are installed in fixed location within mold box 41 being tightly aligned to, firmly braced, and held fast from relative movement by the tapered ends 46 of flanges 45, tapered surfaces 48 of spine members 47, bottom pallet 50, and top plate 44 which can have gaskets 49.

When truss web members 20 are in fixed position within mold assembly 40, discrete residual cavities 52 are formed with each cavity 52 being defined by the generally vertical walls of mold box 41, walls of end core liners 42, wall of core bell 43, truss ends 22, and truss flanges 24. Connector tongues 26 extend into the cavities 52. The cavities 52 are open on the top and closed on the bottom by bottom pallet 50.

The abutting and mating contact of tapered surfaces 28 of truss-web members 20 to tapered ends 46 of flanges 45 creates a seal between the truss-web members 20 and end core liners 42 and the truss-web members 20 and center core bell 43 which prevents passage of cement mixture from flowing into cavity spaces 57 between the end core liners 42 and the core bell 43.

Cement mixture 55, preferably a low slump mixture consisting generally of a combination of cement, cement substitutes, sand, aggregate, and water, is placed from above into formed cavities 52, which is known in the art of block making. When placed into formed cavities 52, the cement mixture 55 collectively flows around, above and below the extending tongues 26 of truss-web members 20 and forms thickset appendages 14 and facing panels 12 (as shown in FIG. 1). Truss ends 22 and flanges 24 surround, and the truss tongues 26 embed into, a portion of the collective mass of the cement mixture 55, which integrates and bonds the truss-web members 20 to the masonry facing panels 12.

Mold assembly 40 is mechanically vibrated and cement mixture 55 is mechanically compacted with compression shoes (not shown) that are configured to match the horizontal profile of cavities 52, which is known in the art of block making. The truss-web members 20 are firmly confined from movement relative to the mold assembly 40, horizontally by flange tapered ends 46 and spike tapered end 48 and vertically by pallet 50 and top plate 44 that can have gaskets 49 and results in the truss-web members 20 to utterly communicate with the vigorous movement of the mold assembly 40 during the vibration and compaction process without independent wiggle and provides for the cement mixture 55 to become tightly formed around truss tongues 26 and completely filled within the space between extended end flanges 24 without consequential gaps forming between the mentioned components.

Cement mixture 55 is allowed to set for approximately five (5) seconds, and then downward mechanical force is applied by the compression shoes to the cement mixture 55 while pallet 50 is simultaneously lowered down from mold assembly 40, which is known. The stiffened—from vibration and compaction—cement mixture 55 is contiguous and integrally fastened with cross-web members 20 and together these amalgamated components are concurrently lowered and released from the mold assembly 40 producing a finished composite block unit 10 (as shown in FIG. 1). The pallet 50 with block unit 10 thereon is then delivered to a kiln where the cement mixture 55 is cured and hardened in accordance with known practices.

Figure 7:
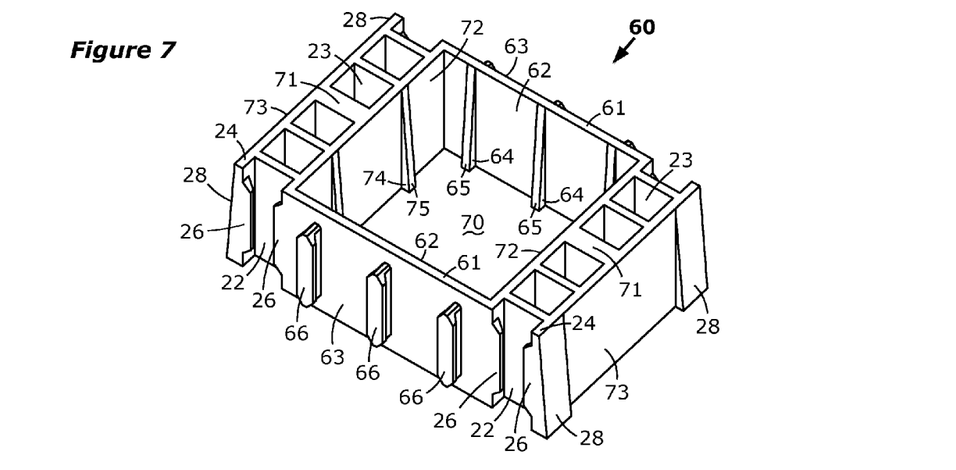
FIG. 7 is a perspective view of an alternative configuration having multiple truss-web members united together with connecting components forming a truss-module.

FIG. 7 illustrates an alternate embodiment of the disclosure. A truss-module generally designated by reference numeral 60 is shown, which incorporates two truss-web members and features thereof as disclosed above including, but not limited to, truss ends 22, cavities 23, flanges 24, truss tongues 26, and extended tapered flanges 28.

Truss-module 60 is made of rigid non-masonry synthetic material such as plastic and includes two truss-web components 71 joined together with generally planer panels 61 that serve to connect and space apart the truss-web components 71. The truss-web components 71 incorporated with the panels 61 configure an inner vertical cavity 70.

Panels 61 have inner surfaces 62 and outer surfaces 63. The panels 61 include formed ribs 64 on the inner surfaces 62, which can extend less than or equal to the full height of the panels 61. The panel ribs 64 comprise planer tapered ends 65 with thicker mass trending downward. Variations of the taper on the ends 65 can include an arc, curve, obtuse angle segments, and other such configurations that provide a contour with thicker mass trending downward. The panel ribs 64 can be one, two, three (shown), or more of any variety of widths being solid or portions thereof comprising hollows and placed at various locations along the inner surfaces 62 or can be a continuously formed tapered surface formed along entire the inner surfaces 62 being solid or portions thereof comprising hollows. The ribs 64 with tapered ends 65 are purposed for alignment and positioning during placement of truss-module 60 into mold assembly 80 (as shown in FIG. 8) and bracing and holding fast the truss-module 60.

FIG. 7 illustrates an embodiment of connector stud members 66 formed on, integrally attached to, and extending away from the outer surfaces 63 of panels 61, which serve to further amalgamate the truss-module 60 with cement mixture. The studs 66 are formed less than the height of the panels 61 and are offset from both the top and bottom of the panels 61. The studs 66 are "T" shaped as viewed in horizontal cross-section but may assume a variety of other shapes configured having a massed segment thereof larger in size than a segment thereof in closer proximity to the outer surface 63.

Figure 12:
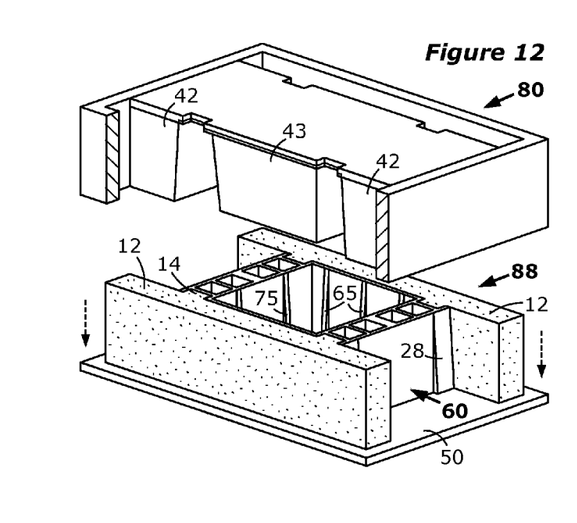
FIG. 12 is a view similar to FIG. 11 showing pallet lowered from mold assembly and supporting thereon a composite masonry block having parallel, longitudinal, concrete face shells amalgamated with a synthetic truss-module.

It is understood that the studs 66 may be one, two, three (shown), or more, may be formed in various configurations such as being hollow, perforated, offset, or planer or slanted protrusions, and may be positioned at various locations on or in the outer surface 63 of panels 61. The intent of the studs 66 or other formed configurations is such that when plastic cement material is added to the molds, it dispenses in, through, below, to the sides, above, and/or around portions of the stud members or other configurations and integrates and bonds together truss-module 60 with formed masonry face panels 12 (as shown in FIG. 12), which further resists lateral and vertical movement relative to the facing panels 12 and provides torsional stiffness to the composite block unit 90 (as shown in FIG. 12).

The truss-web portions 71 of truss-module 60 have inner surfaces 72 and outer surfaces 73. The truss-webs 71 contain formed ribs 74 on the inner surfaces 72, which extend less than or equal to the full height of the truss-webs 71. The panel ribs 74 comprise planer tapered ends 75 with thicker mass trending downward. Variations of the taper on the tapered ends 75 can include an arc, curve, obtuse angle segments, and other such configurations that provide a contour with thicker mass trending downward. The truss-web ribs 74 may be one, two (shown), or more of any variety of widths being solid or portions thereof comprising hollows and placed at various locations along the inner surfaces 72 or may be a continuously formed tapered surface formed along entire the inner surfaces 72 being solid or portions thereof comprising hollows. The ribs 74 having the tapered ends 75 are purposed to align, and position during placement of the truss-module 60 into mold assembly 80 (as shown in FIG. 8) and brace and provide fixed positioning to the truss-module 60 during further production.

FIG. 8 illustrates an alternate embodiment of a block forming mold assembly fabricated according to the present disclosure is generally designated by reference numeral 80, which incorporates and combines features of mold assembly 40 as disclosed above including, but limited to, mold box 41 (partially shown), top plate 54 having modifications (partially shown) that can have continuous gasket 79 encompassing the horizontal profile of truss-module 60 (partially shown), end core liners 42 (one shown) having modifications, and center core bell 43 having modifications.

The end core liners 42 can be hollow or solid and comprise generally vertical planer sides 81 and tapered planer side 82 with thicker mass trending upward. Variations of the tapered side 82 can include an arc, curve, obtuse angle segments, and other such configurations that provide a contour with thicker mass trending upward. The upward slant of the tapered sides 82 are formed in opposing orientation to and in mating alignment with the downward slant of tapered extended flanges 28. In lieu of the tapered sides 82, end core liners 42 can be formed with extended flanges 45 having tapered ends 46 with thicker mass trending upward (as shown in FIG. 5).

The center core bell 43 can be hollow or solid and fashioned comprising planer tapered sides 83 and sides 84 having thicker mass trending upward. Variations of the tapered sides 83 and 84 can include an arc, curve, obtuse angle segments, and other such configurations that provide a contour with thicker mass trending upward. The upward slant of the tapered sides 83 are formed in opposing orientation to and in mating alignment with the downward slant of tapered ends 75 of truss ribs 74, and the length of the tapered sides 83 correspond to the biased distance between tapered ends 65 of panel ribs 64. The upward slant of tapered sides 84 are formed in opposing orientation to and in mating alignment with the downward slant of tapered ends 65 of panel ribs 64, and the length of the tapered sides 84 correspond to the biased distance between tapered ends 75 of truss ribs 74. In lieu of tapered sides 83 and 84, center core bell can be formed with extended flanges comprising tapered sides formed in opposing orientation to and in mating alignment with the slants and locations of tapered ends 65 and 75 with thicker mass trending upward, or mold assembly can be fashioned having spines that are attached to the top plate 54 and comprise tapered surfaces that are formed in opposing orientation to and in mating alignment with the locations and slants of the tapered ends 65 and 75 with thicker mass trending upward.

Figure 9:
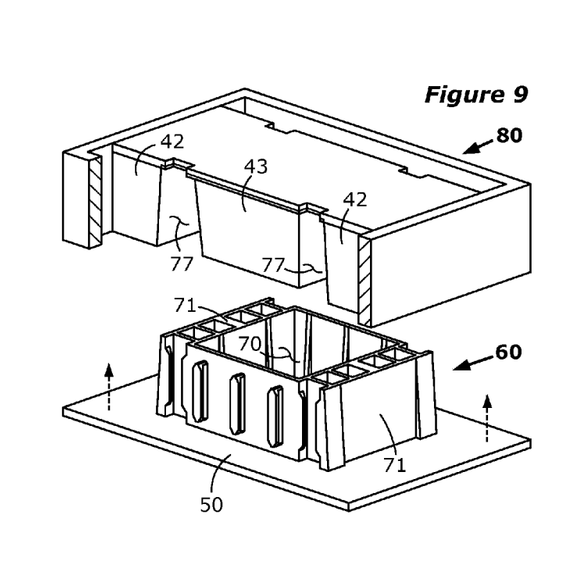
FIG. 9 is a fractional perspective view similar to FIG. 8 and shows relative movement between a pallet having a truss-module supported thereon and a mold assembly.

As seen in FIG. 9, the truss-module 60 is placed on, and rest upon, pallet 50 prior to the pallet 50 being delivered beneath mold assembly 80 or the truss-module 60 can be placed on the pallet 50 when the pallet 50 is in fixed position immediately underneath the mold assembly 80 and the pallet 50 is set to be lifted. Once aligned and positioned below mold assembly 80, the pallet 50 is raised which lifts the truss-module 60 thereon where it merges with the mold assembly 80. Center core bell 43 installs within cavity 70 and truss-web components 71 install within cavity spaces 77 formed between the center core bell 43 and end core liners 42. With additional reference to FIGS. 7 and 8, the truss-module 60 becomes aligned into specific position by tapered ends 65 of panel ribs 64 engaging contact with tapered sides 84 of the center core bell 43 and tapered ends 75 of truss ribs 74 engaging contact with tapered sides 83 of the center core bell 43.

Figure 10:
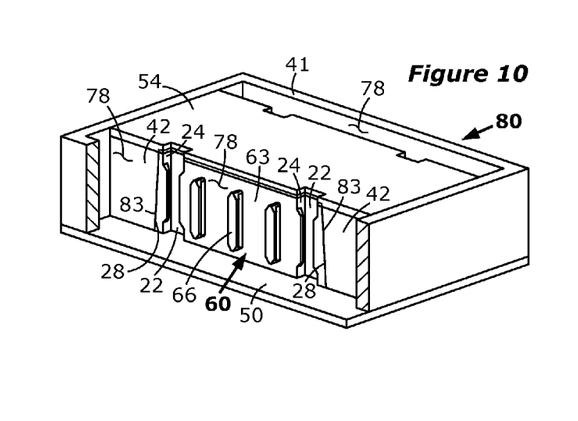
FIG. 10 is a view similar to FIG. 9 showing pallet raised to abut mold assembly, with a truss-module inserted into, aligned with, braced, and held fast by mold assembly apparatuses, with the apparatuses and the truss-module establishing residual cavities for receiving block forming cement material.

Referring to FIG. 10, when the block forming device is in position as shown with pallet 50 raised and abutting mold assembly 80, truss-module 60 is precisely situated within the mold assembly 80 being aligned, braced, and held fast from relative movement by end core liners 42 and center core bell 43 (as shown in FIG. 9), bottom pallet 50, and top plate 54 that can have gasket 79.

The tapered flanges 28 of truss-webs portions 71 mate with and tightly abut to tapered sides 83 of end core liners 42 and create secure seals between truss-module 60 and the end core liners 42 which confines the passage of cement mixture from flowing into cavity spaces 77 between the end core liners 42 and center core bell 43 (as shown in FIG. 9) or portions thereof not occupied by truss-web components 71.

As shown in FIG. 10 (with additional reference to FIGS. 7 and 8), residual cavities 78 are formed with the cavities 78 being defined by the generally vertical walls of mold box 41, generally vertical walls of end core liners 42, outer surface 63 of panels 61, truss ends 22, and truss flanges 24. Connector tongues 26 and studs 66 extend into the cavities 78. The cavities 78 are open on the top and closed on the bottom being defined by bottom pallet 50.

Figure 11:
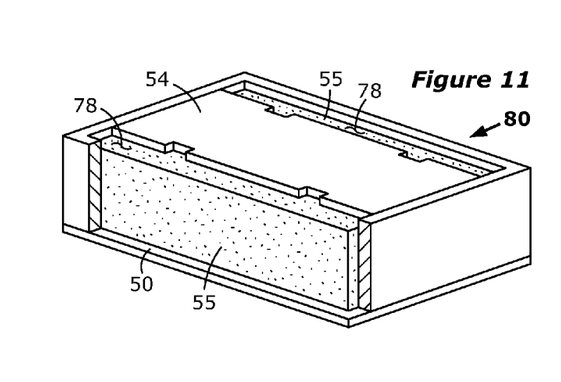
FIG. 11 is a view similar to FIG. 10 showing a block forming mold assembly having truss-module and block forming cement material therein.

As represented in FIG. 11, cement mixture 55 is placed from above mold assembly 80, which is known. With additional reference to FIGS. 7, 10, and 12, when the cement mixture 55 is placed into formed cavities 78, the cement mixture 55 collectively flows above, around, and below extending tongues 26 on flanges 24 of truss-web portions 71, collectively flows above, around, and below extended stud members 66 on the outer surface 63 of panels 61, and forms facing panels 12 with appendages 14. Truss-web ends 22 and the flanges 24 surround and the truss tongues 26 and the studs 66 embed into a portion of the collective mass of the cement mixture 55 which integrates and bonds truss-module 60 to the cement mixture 55 that forms masonry facing panels 12 and thickset appendages 14.

Mold assembly 80 is mechanically vibrated and cement mixture 55 is mechanically compacted with tamping shoes not shown) that are configured to match the horizontal profile of cavities 78, which is known in the art of block making. The truss-module 60 is securely confined from movement relative to the mold assembly 80, horizontally by center core bell 43 and end core liners 42, and vertically by bottom pallet 50 and top plate 54 that can have gaskets 79, which results in the truss-module 60 to utterly communicate with the movement of the mold assembly 80 during mechanical vibration and compaction without independent wiggle and provides for the cement mixture 55 to become tightly formed around truss tongues 26, stud members 66, and completely filled within the space between extended end flanges 24 without forming consequential gaps between the components.

As shown in FIG. 12, alter cement mixture 55 is allowed to set for approximately five (5) seconds, pallet 50 is lowered down and away from mold assembly 80 while tamping shoes (not shown) simultaneously push down from above to aid in the release of formed cement mixture in a downward stripping process from the mold assembly 80, which is known. The stiffened—from vibration and compaction—cement mixture 55 becomes contiguous and integrally joined with truss-module 60 and both the cement mixture 55 and the truss-module 60 are concurrently lowered and released together from the mold assembly 80.

According to the disclosure an assembled composite block unit, generally designated by reference numeral 88, is thereby produced comprising two generally planner masonry facing panels 12 contiguous and integrally joined with coupling truss-module 60. Pallet 50 with the composite block unit 88 thereon is then delivered to a kiln where cement mixture 55 is cured and hardened in accordance with blown practices.

Figure 13:
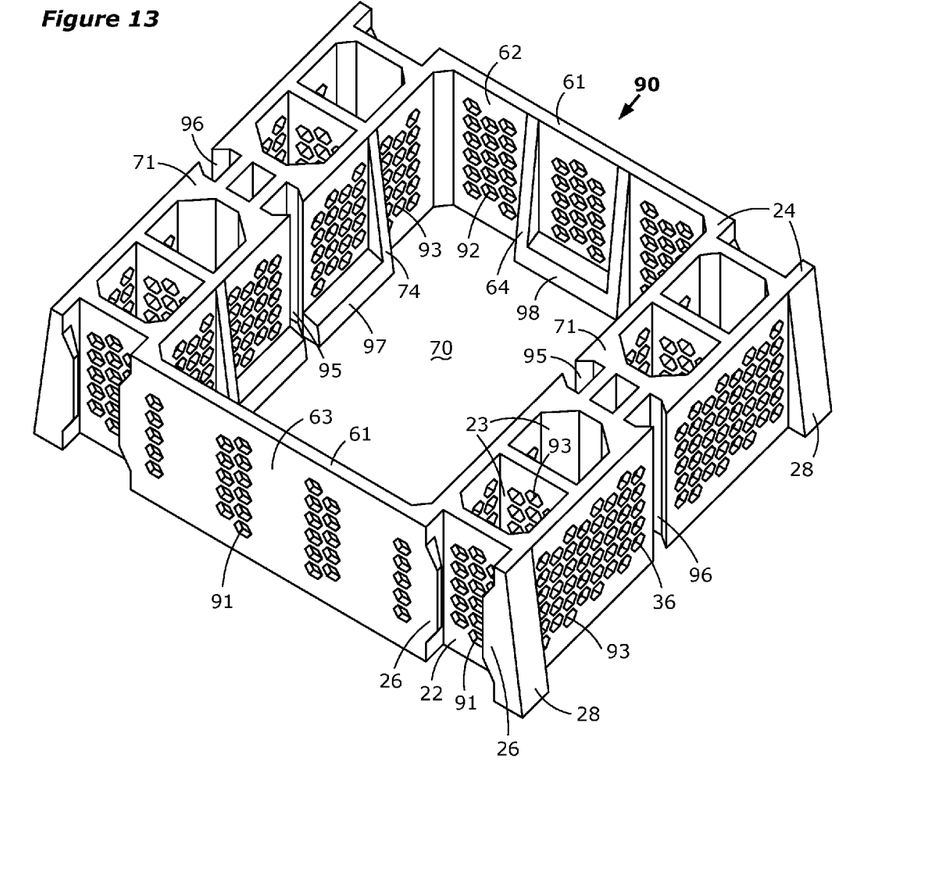
FIG. 13 is a perspective view of an alternative truss-module configuration according to the present disclosure.

FIG. 13 illustrates an alternate embodiment of a truss-module according to the present disclosure generally designated by reference numeral 90, which incorporates truss-module features as disclosed above including, but not limited to, truss-web components 71, truss ends 22, vertical cavities 23, flanges 24, truss tongues 26, extended tapered flanges 28, panels 61 having inner surfaces 62 and outer surfaces 63, extended tapered ribs 64, and extended tapered ribs 74.

Truss-module 90 can comprise indentations 36 formed on truss-web components 71, which are purposed for improved grip during handling of a composite block unit. The truss-module 90 can also comprise indentations 91 on truss ends 22 and on outer surfaces 63 of panels 61, which may be formed in various configurations positioned at various locations. The intent of the indentations 91 is such that when plastic cement material is added to the molds during forming of concrete face panels 12 (as shown in FIG. 12), it dispenses within the indentations 91 and integrates and bonds together truss-module 90 with the formed masonry face panels 12, which further resists lateral and vertical movement relative to the facing panels 12 and provides torsional stiffness to the composite block unit 90.

Truss-module 90 can further comprise indentations 92 on inner surfaces 62 of panels 61 to which concrete grout mixture can flow within and more readily bond to when masonry walls constructed with the composite block are filled with the grout mixture to strengthen the walls. This improved bonding of the concrete grout to the truss-module, which is integrated to the face shell panels, provides increased flexural strength to the masonry walls.

Truss-module 90 can further comprises one, two or more horizontal cavities 93 within truss-web portions 71, which may be formed in various configurations and positioned at various locations within the body thereof, that allow vertical cavities 23 to communicate with other adjoining vertical cavities 23, interior vertical cavity 70, and to the exterior of the truss-web portions 71. The horizontal cavities 93 are preferably sized with a ⅜" diameter, but can be sized from ⅛" to 1" diameter, the cavity opening size being small enough to prevent the passage of plastic cement grout from passing through walls of the truss-web portions 71, but is also large enough to allow the passage of injected foam insulation to pass through walls of the truss-web portions 71, conditions that occur when composite block units are used to construct a reinforced and/or insulated masonry wall.

Truss-module 90 can further comprise retaining grooves 95 and 96 formed on truss-web portions 71 extending vertically over the entire height of the truss-web portions 71, which are useful in securing dividing members (not shown) spanning between interior facing retaining grooves 95 of the same truss-module 90 or spanning between exterior facing retaining grooves 96 of two separate adjacent truss-modules when used in a wall built with composite block units. Having the dividing members inserted into the retaining grooves 95 divides interior vertical cavity 70 into two separate vertical cavities that can be used, one, for the confined placement of vertical steel reinforcing and cement grout mixture and, the other, for the confined placement of insulation material.

Truss-module 90 can further comprise thickened wall segments 97 on truss-web portions 71 that do not expand outside the profile of extended tapered ribs 74, and thickened wall segment 98 on interior surfaces 62 of panels 61 that do not expand outside the profile of extended tapered ribs 64. The wall segments 97 and segment 98 extend vertically over only a portion of the height of the truss-module 90 and are purposed for improved pip during handling of a composite block.

The present disclosure reveals modules and method for constructing a structural composite block. While specific embodiments and advantages of the disclosure, its components, assembly, and making have been conveyed in the foregoing description, it is apparent that alterations, modifications, and variations will be apparent to those skilled in the art of the ideas presented. Accordingly, it is intended to embrace any and all such alterations, modifications, and variations as fall within the broad scope and spirit of the present disclosure.

In some embodiments of the present disclosure, novel block structure and composition and block making methods comprise a structural composite block unit containing two spaced apart generally planer and parallel facing panels consisting of masonry material including concrete, which can have inwardly oriented thickset segments integrally formed thereon, the thickset segments are spaced apart along the length of the facing panels such that when multiple composite block units are laid in a one-half running bond pattern (the pattern being commonly understood in the industry as the placement of masonry units so that the vertical mortar joints between ends of adjacent units in successive courses are horizontally offset one-half the unit length in courses above and below) the first thickset segment of one block is stacked and in direct vertical alignment with the second thickset segment of the other block units above and below; and extending between, joined together, and contiguous with the facing panels that can have thickset segments are two non-masonry material connective coupling truss-web members formed of equal length with respect to each other and comprising connecting member elements including various configured protrusions, indentations, and/or holes thereon allowing the concrete material to be formed around, in, and/or through the connecting member elements during the molding process of the masonry facing panels that integrally joins and interlocks the truss-web members and the facing panels together.

In some embodiments of the present disclosure can comprise a truss-web module containing non-masonry material truss-web components connected and spaced apart with solid partially void, indented, and/or textured contiguous non-masonry material panels or other configured elements extending between the truss-web components, the panels and truss-web components of truss-module comprising connecting member elements including various configured projections, indentations and/or holes thereon allowing concrete material to be formed in, above, below, to the sides, and/or around the connecting member elements during the casting and molding process of masonry facing panels which integrally joins together and interlocks the truss-module with the masonry facing panels.

Truss-webs members and/or truss-web components of a truss-module can be solid, or have one, or a plurality of vertical holes or other shaped hollow cavities located within the truss-web body, and/or have one or a plurality of horizontal holes, indents, or other shaped hollow cavities located within the truss-web body, and/or one or a plurality of protrusions or have textured surfaces on the truss-web body.

Truss-web members and/or truss-web components of a truss-module can have vertical holes or other shaped hollow cavities within the body thereof and can have horizontal holes or other shaped hollow cavities within the body thereof the horizontal hole openings sized from ⅛" to 1" diameter.

Truss-web members and/or truss-web components of a truss-module can have tapered extended flanges, ribs, and/or tapered extended sides having thicker mass trending downward which extend vertically either partially or over the entire height of the truss-web members; the tapered flanges and ribs can include having one, two, or more tapered flanges of ribs of any variety of widths, or a continuously formed tapered flange or rib along entire the sides the flanges, ribs, and sides can comprise a planer taper with thicker mass trending downward or alternately can comprise an arc, curve, obtuse angle segments, and other such configurations that provide a contour with thicker mass trending downward; and the flanges, ribs, and/or sides can be formed in opposing orientation to and in mating alignment with tapered mold assembly apparatuses having tapered flanges and/or sides having thicker mass trending upward.

Truss-web members and/or truss-web components of a truss-module can comprise tapered sections with thicker mass trending downward formed on the interior faces of wall segments that define vertical cavities within body of the truss-webs and/or truss module; the tapered sections can comprise a planer taper with thicker mass trending downward or alternately can comprise an arc, curve, obtuse angle segments, and other such configurations that provide a contour with thicker mass trending downward; and the tapered sections can be formed in opposing orientation to and in mating alignment with tapered mold assembly apparatuses having tapered flanges and/or sides having thicker mass trending upward.

Apparatuses of a mold assembly can have tapered flanges, spikes, and/or tapered sides having thicker mass trending upward formed on, suspended, and/or fixed to the mold assembly, which extend vertically either partially or over the entire height of the mold assembly; the mold assembly apparatuses can be formed in opposing orientation to and in mating alignment with tapered truss-web flanges and/or tapered truss-web sides having a thicker mass trending downward; and the mold assembly apparatuses can be formed in opposing orientation to and in mating alignment with tapered rib and/or flange components of a truss-module having a thicker mass trending downward.

Truss-web members and/or truss-web components of truss-module can have a top width dimension narrower than the widest width dimension of mold assembly cavity spaces they are inserted into, and truss-web members and/or truss-web components of truss-module can have a vertical section profile dimension that is equivalent to the vertical section profile of the mold assembly cavity spaces they are inserted into.

In some embodiments of the present disclosure, novel block composition and block making methods for forming a structural composite block consists of placing individual synthetic truss-web components or truss-module consisting of truss-web members joined with connecting panel or panels or other configured components extending between the truss-web components on a lower support member and conveying the support member with the truss-web members or the truss-module thereon to a position beneath a mold assembly, or placing the truss-web members or the truss-module on support member when the support member is in a stationary position beneath the mold assembly; the truss-web members or truss-web components of truss-module can consist of a solid or cored body, ends having formed flanges, tongues, protrusions and/or voids, and solid tapered portions thereof with thicker mass trending downward and the connecting panels can consist of a solid or cored body having formed anchors, protrusions, cavities, and/or voids; and the mold assembly consisting of solid walls and apparatuses with tapered portions thereof with thicker mass trending upward and providing a conterminous cavity comprising interconnected cavity space segments; raising the support member with the truss-web members and/or the truss-module thereon to abut bottom of the mold assembly causing the truss-web members and/or the truss-module to be guided and inserted into the conterminous cavity of the mold assembly by the mating contact of the tapered portions of the truss-webs and/or the truss-module with the tapered portions of the mold assembly apparatuses; the installation of the truss-webs and/or the truss-module into the mold assembly consequently fashions two separated independent residual cavity spaces each defined by the lower support member, some walls of the mold assembly, some walls of the apparatuses, ends of the truss-web members and/or the truss-module, flanges of the truss-web members and/or the truss-module, and/or walls of the connecting panels; placing block forming material into the formed residual cavities, the block forming material flowing in, by, above, below, and/or around formed the flanges, tongues, protrusions, and/or voids of the truss-web members and/or the truss-module and/or connecting panels; vibrating and/or compacting the block forming material; and lowering the support member with the truss-web members and/or truss-module connected and united together with the block forming material thereon providing a composite block unit.

In some embodiments, the step wherein once truss webs and/or truss-module are inserted into the mold assembly the truss webs and/or truss-module are securely held in horizontal and vertical fixed position relative to the mold assembly by mold assembly apparatuses in order for the truss-webs and/or truss-module to communicate with the movement and vibration of the mold assembly.

In some embodiments, the step wherein once truss-webs and/or truss-module are inserted into the mold assembly portions of the truss-webs and/or truss-module register together with other mold assembly apparatuses to form partitions that create and define distinctive cavities for the placement of cement material cast generally rectangular masonry face panels that can have thickset appendages.

In some embodiments, the step wherein once truss webs and/or truss-module are inserted into the mold assembly portions of the truss-webs and/or truss-module register together with other mold assembly apparatuses to create a seal to prevent passage of masonry material into other cavity and/or hollow portions of the mold assembly.

I claim:

1. A composite structural block comprising:
   a pair of generally planar facing panels each formed from a masonry material including concrete, wherein each of the facing panels defines an outer surface of the structural block; and
   a pair of truss-web members extending between and interlocked and molded with an inner surface of each of the pair of facing panels, wherein the truss-web members are each formed from a non-masonry material and include a pair of spaced vertical sidewalls and a pair of opposite end walls that each extend between the pair of vertical sidewalls to create a portion of a mold forming boundary for the inner surface of the facing panels.

2. The structural block of claim 1 wherein each of the opposite end walls include a pair of end flanges that extend from the end wall, wherein the end flanges interlock with one of a pair of appendages that extend from the inner surface of the facing panel.

3. The structural block of claim 2 wherein the pair of end flanges on each end of the truss-web member defines an open channel having a length from a top end to a bottom end, wherein each truss-web member further includes at least one connector tongue extending into each of the open channels from one of the end flanges over less than the length of the open channel, wherein the open channels receive the masonry material during formation of the facing panels such that the connector tongues interlock the truss-web member to the facing panel.

4. The structural block of claim 2 wherein the pair of end flanges on each end of the truss-web member defines an open channel, wherein each truss-web member further includes at least one indentation or hole extending into the end wall of the open channels, wherein the open channels receive the masonry material during formation of the facing panels such that the indentations or holes further interlock the truss-web member to the facing panel.

5. The structural block of claim 2 wherein the truss-web member includes at least one cavity formed between the vertical sidewalls and the opposite end walls.

6. The structural block of claim 2 wherein each of the vertical sidewalls includes a series of openings sized from ⅛ inch to 1 inch in diameter.

7. The structural block of claim 6 wherein each of the truss-members includes one or more extended alignment flanges formed on each of the vertical sidewalls, wherein the extended alignment flanges increase in thickness from a first end to a second end.

8. A composite structural block comprising:
a pair of generally planar facing, panels each formed from a masonry material including concrete, wherein each of the facing panels defines an outer surface of the structural block;
a pair of truss-web members extending between and interlocked and molded with an inner surface of each of the pair of facing panels, wherein the truss-web members are each formed from a non-masonry material and include a pair of spaced vertical sidewalls and a pair of opposite end walls that each extend between the pair of vertical sidewalls to create a portion of a mold forming boundary for the inner surface of the facing panels; and
a pair of connector panels that join the pair of members to define a unitary truss module, wherein the pair of connector panels create a mold forming boundary for at least a portion of the facing panels.

9. The structural block of claim 8 wherein each of the opposite end walls includes a pair of end flanges that extend from the end wall, wherein the end flanges interlock with one of a pair of appendages that extend from the inner surface of the facing panel.

10. The structural block of claim 9 wherein the pair of end flanges on each end of the truss-web member defines an open channel having a length from a top end to a bottom end, wherein each truss-web member further includes at least one connector tongue extending into each of the open channels from one of the end flanges over less than the length of the open channel, wherein the open channels receive the masonry material during formation of the facing panels such that the connector tongues interlock the truss-web member to the facing panel.

11. The structural block of claim 9 wherein the pair of end flanges on each end of the truss-web member defines an open channel, wherein each truss-web member further includes at least one indentation or hole extending into the end wall and/or end flanges of the open channels, wherein the open channels receive the masonry material during formation of the facing panels such that the indentations or holes interlock the truss-web member to the facing panel.

12. The structural block of claim 9 wherein the truss-web member includes at least one cavity formed between the vertical sidewalls and the opposite end walls.

13. The structural block of claim 8 wherein the truss module includes one or more connector studs that are received in one of the facing panels to further interlock the truss module to the facing panels.

14. The structural block of claim 9 wherein each of the vertical sidewalls includes a series of openings sized from ⅛ inch to 1 inch in diameter.

15. The structural block of claim 14 wherein each of the truss-members includes one or more extended alignment flanges formed on each of the vertical sidewalls, wherein the extended alignment flanges increase in thickness from a first end to a second end.

16. The structural block of claim 14 wherein each of the connector panels includes one or more extended alignment, flanges formed on the interior surface, wherein the extended alignment flanges increase in thickness from a first end to a second end.

17. The structural block of claim 8 wherein each of the connector panels includes a plurality of indentations formed in an outer surface, wherein each of the indentations receive the masonry material that forms one of the facing panels.

18. The structural block of claim 9 wherein each of the end flanges includes a plurality of indentations that each receive the masonry material that forms one of the facing panels.

* * * * *